United States Patent
Gupta et al.

(10) Patent No.: US 12,158,958 B2
(45) Date of Patent: Dec. 3, 2024

(54) WEB ATTACK SIMULATOR

(71) Applicant: Virsec Systems, Inc., San Jose, CA (US)

(72) Inventors: Satya V. Gupta, Dublin, CA (US); Rohan Ahuja, Gurugram (IN); Mahendra Nath Tommandru, Electronic (IN); Joyanto Ghosh, Bengaluru (IN); Vishal Dixit, Bangalore (IN); Ebin Sabu, Bommasandra (IN)

(73) Assignee: Virsec Systems, Inc., San Jose, CA (US)

(*) Notice: Subject to any disclaimer, the term of this patent is extended or adjusted under 35 U.S.C. 154(b) by 307 days.

(21) Appl. No.: 17/578,022

(22) Filed: Jan. 18, 2022

(65) Prior Publication Data

US 2022/0198025 A1    Jun. 23, 2022

Related U.S. Application Data

(63) Continuation-in-part of application No. 17/460,004, filed on Aug. 27, 2021, now Pat. No. 11,907,378, and
(Continued)

(30) Foreign Application Priority Data

Jan. 18, 2021    (IN) .............................. 202141002185

(51) Int. Cl.
G06F 21/57 (2013.01)
(52) U.S. Cl.
CPC ...... *G06F 21/577* (2013.01); *G06F 2221/033* (2013.01)

(58) Field of Classification Search
CPC .................. G06F 21/577; G06F 2221/033
See application file for complete search history.

(56) References Cited

U.S. PATENT DOCUMENTS

| 6,321,334 B1 | 11/2001 | Jerger et al. |
| 8,347,267 B2 | 1/2013 | Givoni et al. |

(Continued)

FOREIGN PATENT DOCUMENTS

| WO | 2015/007166 A1 | 1/2015 |
| WO | 2016/130372 A1 | 8/2016 |

(Continued)

OTHER PUBLICATIONS

"ATT&CK (Registered)", The Mitre, Available online at: <https://attack.mitre.org>, Sep. 14, 2023, 1 page.
(Continued)

*Primary Examiner* — Meng Li
(74) *Attorney, Agent, or Firm* — Hamilton, Brook, Smith & Reynolds, P.C.

(57) ABSTRACT

Embodiments identify vulnerabilities in, e.g., a web application. An embodiment first, searches a database to identify payload characteristics for a Hypertext Transfer Protocol (HTTP) request associated with a uniform resource locator (URL) of a web application. In turn, one or more payloads with characteristics corresponding to the identified payload characteristics are obtained. Next, the HTTP request with the obtained one or more payloads is sent to the URL. Then, one or more responses to the HTTP request sent with the obtained one or more payloads are observed to determine if the web application includes one or more vulnerabilities.

18 Claims, 13 Drawing Sheets

Related U.S. Application Data a continuation-in-part of application No. PCT/US2021/048077, filed on Aug. 27, 2021.

(60) Provisional application No. 63/190,099, filed on May 18, 2021, provisional application No. 63/155,464, filed on Mar. 2, 2021, provisional application No. 63/155,466, filed on Mar. 2, 2021, provisional application No. 63/133,173, filed on Dec. 31, 2020, provisional application No. 63/071,113, filed on Aug. 27, 2020.

(56) References Cited

U.S. PATENT DOCUMENTS

| | | |
|---|---|---|
| 9,246,935 B2 | 1/2016 | Lietz et al. |
| 9,418,230 B2 | 8/2016 | Archer et al. |
| 9,501,650 B2 | 11/2016 | Chess et al. |
| 9,578,060 B1 | 2/2017 | Brisebois et al. |
| 9,589,560 B1 | 3/2017 | Vitaladevuni et al. |
| 10,116,681 B2 | 10/2018 | Cornell et al. |
| 10,354,074 B2 | 7/2019 | Gupta |
| 10,387,659 B1 | 8/2019 | Youngberg et al. |
| 10,395,041 B1 | 8/2019 | Youngberg et al. |
| 10,447,730 B2 | 10/2019 | Gupta |
| 10,467,419 B1 | 11/2019 | Youngberg et al. |
| 11,615,061 B1 | 3/2023 | Malik et al. |
| 11,907,378 B2 | 2/2024 | Gupta |
| 2003/0074207 A1 | 4/2003 | Pace et al. |
| 2004/0046785 A1 | 3/2004 | Keller |
| 2005/0102534 A1 | 5/2005 | Wong |
| 2007/0199000 A1 | 8/2007 | Shekhel et al. |
| 2008/0052527 A1 | 2/2008 | Siedlarz |
| 2009/0119769 A1 | 5/2009 | Ross et al. |
| 2013/0111595 A1* | 5/2013 | Amit .............. G06F 21/566 726/25 |
| 2014/0082735 A1* | 3/2014 | Beskrovny .......... H04L 63/1433 726/25 |
| 2014/0082739 A1 | 3/2014 | Chess et al. |
| 2014/0165192 A1 | 6/2014 | Zhu et al. |
| 2015/0215332 A1 | 7/2015 | Curcic et al. |
| 2015/0261653 A1 | 9/2015 | Lachambre et al. |
| 2015/0309813 A1 | 10/2015 | Patel |
| 2016/0164891 A1 | 6/2016 | Satish et al. |
| 2016/0241582 A1* | 8/2016 | Boia .................. H04L 63/1433 |
| 2017/0270303 A1 | 9/2017 | Roichman et al. |
| 2017/0288878 A1 | 10/2017 | Lee et al. |
| 2017/0353434 A1 | 12/2017 | Al-Saber et al. |
| 2018/0349602 A1* | 12/2018 | Johns ................ G06F 21/552 |
| 2019/0138725 A1 | 5/2019 | Gupta |
| 2019/0286833 A1 | 9/2019 | Takumi et al. |
| 2020/0004963 A1 | 1/2020 | Zheng et al. |
| 2020/0042714 A1 | 2/2020 | Gupta |
| 2020/0065166 A1 | 2/2020 | Myneni et al. |
| 2020/0097662 A1 | 3/2020 | Hufsmith et al. |
| 2020/0134193 A1 | 4/2020 | Youngberg et al. |
| 2020/0134194 A1 | 4/2020 | Youngberg et al. |
| 2020/0134195 A1 | 4/2020 | Youngberg et al. |
| 2020/0167477 A1* | 5/2020 | Ionescu ............. G06F 21/577 |
| 2020/0336507 A1 | 10/2020 | Lee et al. |
| 2021/0086089 A1 | 3/2021 | Pardeshi et al. |
| 2021/0099483 A1* | 4/2021 | Shukla ............... G06F 21/566 |
| 2021/0160273 A1 | 5/2021 | Choi et al. |
| 2022/0046031 A1 | 2/2022 | Kaidi |
| 2022/0067174 A1 | 3/2022 | Gupta |
| 2022/0207151 A1 | 6/2022 | Gupta |
| 2022/0210180 A1 | 6/2022 | Gupta |
| 2022/0214928 A1 | 7/2022 | Gupta et al. |
| 2022/0391506 A1 | 12/2022 | Gupta |
| 2023/0004652 A1 | 1/2023 | Gupta |

FOREIGN PATENT DOCUMENTS

| | | |
|---|---|---|
| WO | 2020/026228 A1 | 2/2020 |
| WO | 2022/047245 A1 | 3/2022 |
| WO | 2022/147474 A1 | 7/2022 |
| WO | 2022/147478 A1 | 7/2022 |
| WO | 2022/155685 A1 | 7/2022 |
| WO | 2022/155687 A1 | 7/2022 |
| WO | 2022/246436 A1 | 11/2022 |
| WO | 2022/246437 A1 | 11/2022 |
| WO | 2023/133586 A1 | 7/2023 |

OTHER PUBLICATIONS

"Welcome to YARA's documentation-yara 4.3.2 documentation" Available online at: <https://yara.readthedocs.io/en/stable/>, retrieved on Sep. 14, 2023, 4 pages.

"CAPEC—Common Attack Pattern Enumeration and Classification", (CAPEC(Trademark)), Available on https://capec.mitre.org, Jan. 2, 2022, 2 pages.

"CAPEC View: Mechanisms of Attack", View ID: 1000, (Version 3.6), Available online https://capec.mitre.org/data/definitions/1000.html, Jan. 2, 2022, 2 pages.

"Configuration Management Database (CMDB)", 2023, 15 pages.

"CWE View: Software Development" View ID: 699, Individual Dictionary Definition (4.6), Available on https://cwe.mitre.org/data/definitions/699.html, Jan. 2, 2022, 2 pages.

"Integrated Risk Management (IRM)", Gartner Glossary, Available on https://www.gartner.com/en/information-technology/glossary/integrated-risk-management-irm, Jan. 2, 2022, 5 pages.

"Javap—The Java Class File Disassembler", Oracle, Java SE Documentation, Available on https://docs.oracle.com/javase/7/docs/technotes/tools/windows/javap.html, Jan. 2, 2022, 3 pages.

"The Shadow Brokers", Wikipedia, Available on https://en.wikipedia.org/wiki/The_Shadow_Brokers, Jan. 2, 2022, 8 pages.

"Windows Print Spooler Remote Code Execution Vulnerability", Security Vulnerability, CVE-2021-34527, Available on https://msrc.microsoft.com/update-guide/vulnerability/CVE-2021-34527#title, Jun. 13, 2023, 1 page.

Caputo, D., et al: "Droids in Disarray: Detecting Frame Confusion in Hybrid Android Apps", Jun. 11, 2019 (Jun. 11, 2019), Advances in Databases and Information Systems; [Lecture Notes in Computer Science; Lect.Notes Computer], Springer International Publishing, Cham, pp. 121-139.

Chen et al., "Automated system change discovery and management in the cloud", IBM Journal of Research and Development, vol. 60, No. 2-3, Mar. 1, 2016, pp. 2:1-2:10.

Chen et al., "Detecting and Identifying System Changes in the Cloud via Discovery by Example", 2014 IEEE International Conference on Big Data, Oct. 27, 2014, pp. 90-99.

Chen, Lu., et al, "Research on Mobile Application Local Denial of Service Vulnerability Detection Technology Basec on Rule Matching", 2019 IEEE International Conference on Energy Internet (ICEI), IEEE, May 27, 2019 (May 27, 2019), pp. 585-590.

David Stahl, "What's an RFC and what can they do for me?", Global Knowledge, Available on https://www.globalknowledge.com/us-en/resources/resource-library/articles/whats-an-rfc-and-what-can-they-do-for-me/, Sep. 16, 2009, 2 pages.

International Search Report and Written Opinion received for PCT Patent Application No. PCT/US2021/048077, mailed on Dec. 20, 2021, 11 pages.

International Search Report and Written Opinion received for PCT Patent Application No. PCT/US2021/073197, mailed on Mar. 21, 2022, 10 pages.

International Search Report and Written Opinion received for PCT Patent Application No. PCT/US2021/073201, mailed on Apr. 7, 2022, 10 pages.

International Search Report and Written Opinion received for PCT Patent Application No. PCT/US2022/070236, mailed on Apr. 8, 2022, 15 pages.

International Search Report and Written Opinion received for PCT Patent Application No. PCT/US2022/070240, mailed on Apr. 7, 2022, 17 pages.

International Search Report and Written Opinion received for PCT Patent Application No. PCT/US2022/072416, mailed on Sep. 8, 2022, 13 pages.

(56) References Cited

OTHER PUBLICATIONS

International Search Report and Written Opinion received for PCT Patent Application No. PCT/US2022/072417, mailed on Sep. 8, 2022, 15 pages.

Johns, M., et al., "XSSDS: Server-Side Detection of Cross-Site Scripting Attacks", Computer Security Applications Conference, 2008. Acsac, Dec. 8, 2008, pp. 335-344.

Koutroumpouchos, K., et al., "ObjectMap: detecting insecure object deserialization", PCI '19: Proceedings of the 23rd Pan-Hellenic Conference on Informatics, Nov. 28, 2019, pp. 67-72.

Prevelakis et al., "Sandboxing Applications", USENIX, The Advanced Computing Systems Association, Feb. 25, 2019, pp. 1-9.

Secure execution of privileged scripts ED-Darl Kuhn, ip.com, ip.com Inc., West Henrietta, Sep. 18, 2009, XP013134389.

Sun, F., et al., "Client-Side Detection of XSS Worms by Monitoring Payload Propagation", Advances in Databases and Information Systems, Sep. 21, 2009, pp. 539-554.

Xia, M. et al: "Effective Real-Time Android Application Auditing", 2015 IEEE Symposium on Security and Privacy, IEEE, May 17, 2015 (May 17, 2015), pp. 899-914.

Dizdar, A. , "Why are SAST solutions not always the best option for AST?", Bright, Jan. 22, 2020, 10 pages.

Horvath, M., et al., "Magic Quadrant for Application Security Testing" Gartner Reprint, (33 pages) Apr. 29, 2020, 33 pages, retrieved from https://www.gartner.com/doc/reprints?id=1-1YWZKUB5 &ct=200429&st=sb.

Potdar, S., "The Curious Case of False Positives in Application Security", Security Zone, May 13, 2019, 4 pages.

QwietAI "ShiftLeft Achieves Highest Ever SAST Score on OWASP Benchmark", Nov. 1, 2023, 7 pages, retrieved from https://qwiet.ai/news-press/shiftleft-achieves-highest-ever-sast-score-on-owasp-benchmark/.

International Search Report and Written Opinion received for PCT Patent Application No. PCT/US2023/060379, mailed on Apr. 19, 2023, 15 pages.

Yang Ji, "Efficient and refinable attack investigation," A Dissertation Presented to the Academic Faculty, Georgia Institute of Technology, Dec. 2019, pp. 123.

\* cited by examiner

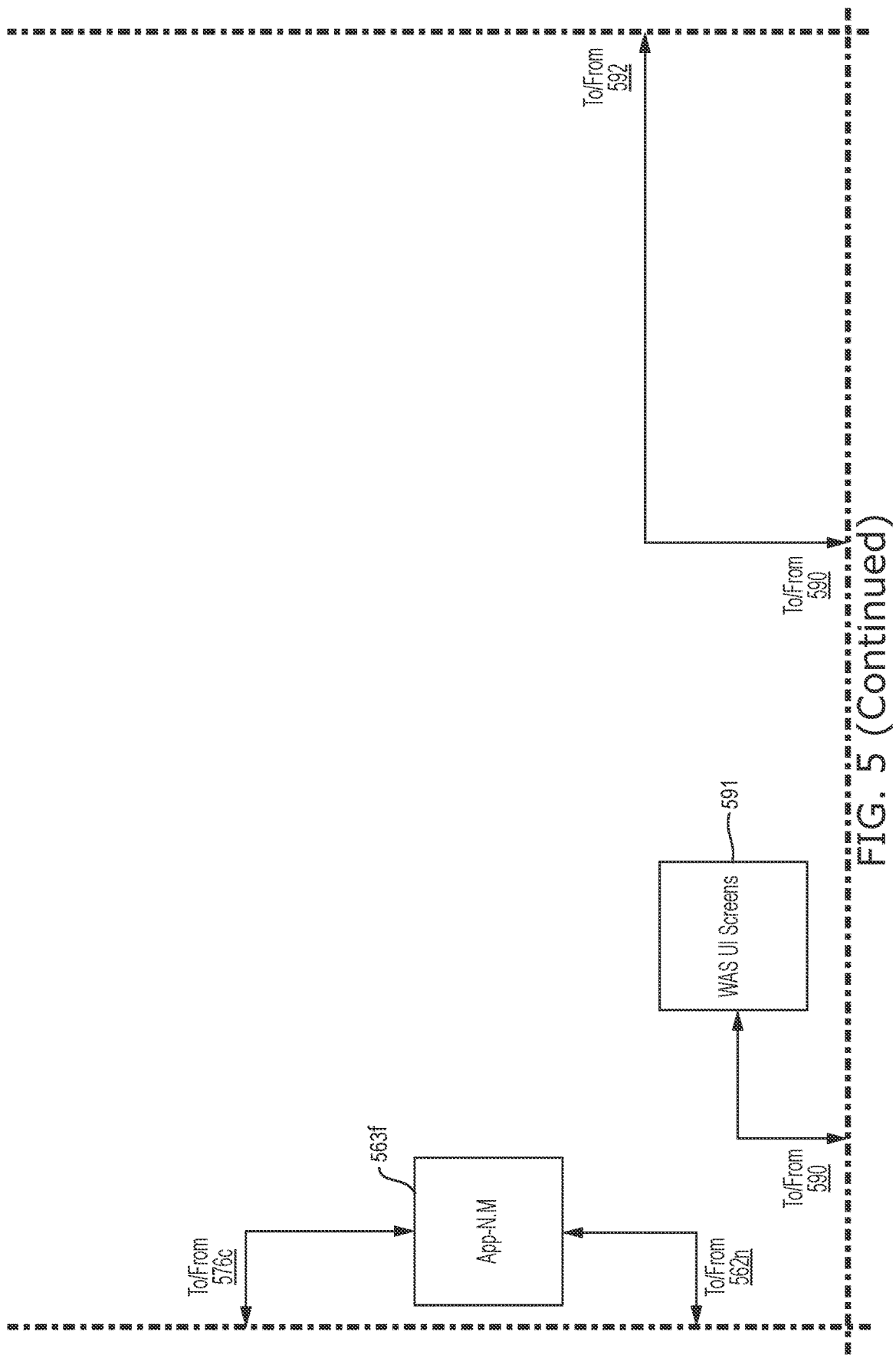

WEB ATTACK SIMULATOR

RELATED APPLICATIONS

This application is a continuation-in-part and claims priority to U.S. application Ser. No. 17/460,004 which was filed on Aug. 27, 2021 and claims the benefit of U.S. Provisional Application No. 63/071,113, filed on Aug. 27, 2020; U.S. Provisional Application No. 63/133,173, filed on Dec. 31, 2020; U.S. Provisional Application No. 63/155,466, filed on Mar. 2, 2021; U.S. Provisional Application No. 63/155,464, filed on Mar. 2, 2021; and U.S. Provisional Application No. 63/190,099, filed on May 18, 2021 and claims priority under 35 U.S.C. § 119 or 365 to Indian Provisional Application No. 202141002208, filed on Jan. 18, 2021 and Indian Provisional Patent Application No. 202141002185, filed on Jan. 18, 2021.

This application is a continuation-in-part of International Application No. PCT/US2021/048077, which designated the United States and was filed on Aug. 27, 2021, published in English, which claims the benefit of U.S. Provisional Application No. 63/071,113, filed on Aug. 27, 2020; U.S. Provisional Application No. 63/133,173, filed on Dec. 31, 2020; U.S. Provisional Application No. 63/155,466, filed on Mar. 2, 2021; U.S. Provisional Application No. 63/155,464, filed on Mar. 2, 2021; and U.S. Provisional Application No. 63/190,099, filed on May 18, 2021 and claims priority under 35 U.S.C. § 119 or 365 to Indian Provisional Application No. 202141002208, filed on Jan. 18, 2021 and Indian Provisional Patent Application No. 202141002185, filed on Jan. 18, 2021.

This application claims the benefit of U.S. Provisional Application No. 63/155,464, filed on Mar. 2, 2021.

The application claims priority under 35 U.S.C. § 119 or 365 to India Application No. 202141002185, filed Jan. 18, 2021.

The entire teachings of the above applications are incorporated herein by reference.

BACKGROUND

With each passing day, cyber-attacks are becoming increasingly sophisticated. Attacks are often targeted to exploit specific vulnerabilities in specific programs, processes, and applications. Various methods and tools exist for identifying vulnerabilities, but these existing methods and tools are inadequate.

SUMMARY

Embodiments provide improved systems, methods, and computer program products for identifying vulnerabilities in programs, processes, and applications.

An example embodiment is directed to a method to identify vulnerabilities in, e.g., a web application. In one such implementation, the method, first, searches a database to identify payload characteristics for a Hypertext Transfer Protocol (HTTP) request associated with a uniform resource locator (URL) of a web application. In turn, one or more payloads with characteristics corresponding to the identified payload characteristics are obtained. Next, the method sends a HTTP request with the obtained one or more payloads to the URL. Then, one or more responses to the HTTP request sent with the obtained one or more payloads are observed to determine if the web application includes one or more vulnerabilities.

An embodiment of the method may take one or more protection, compensation control, or remediation, actions in response to determining the web application includes the one or more vulnerabilities.

According to an embodiment, obtaining the one or more payloads with characteristics corresponding to the identified payload characteristics includes searching a payload database based on the identified payload characteristics to obtain the one or more payloads with characteristics corresponding to the identified payload characteristics.

In yet another embodiment, searching the database to identify payload characteristics for the HTTP request comprises searching the database for an HTTP response that occurred prior to the HTTP request. In turn, such an embodiment identifies the payload characteristics based upon the HTTP response that occurred prior to the HTTP request. In an example embodiment, the HTTP response is immediately prior to the HTTP request in operation, e.g., hierarchical operation, of the web application.

According to an embodiment of the method, each of the obtained one or more payloads corresponds to a respective vulnerability. Further, in such an embodiment, sending the HTTP request with the obtained one or more payloads tests if the web application is susceptible to each respective vulnerability.

In an example embodiment, the payload characteristics include at least one of: type and format.

Yet another embodiment generates a report indicating results of the observing. In such an embodiment, the report indicates one or more elements of the web application that are susceptible to the one or more vulnerabilities. Such susceptible elements may include at least one of: a field, variables in request lines, parameters passed with a request line, and parameters passed through headers.

Further, according to yet another embodiment, the HTTP request is at least one of: a get type request and a post type request. Moreover, in another embodiment, a given payload of the obtained one or more payloads is a common weakness enumeration (CWE) payload.

Another embodiment is directed to a computer system to identify vulnerabilities. The system includes a processor and a memory with computer code instructions stored thereon that cause the system to identify vulnerabilities as described herein. In one such embodiment, the system is configured to first, search a database to identify payload characteristics for a HTTP request associated with a URL of a web application. In turn, one or more payloads with characteristics corresponding to the identified payload characteristics are obtained. Next, the system sends a HTTP request with the obtained one or more payloads to the URL. Then, one or more responses to the HTTP request sent with the obtained one or more payloads are observed by system to determine if the web application includes one or more vulnerabilities.

Yet another embodiment is directed to a computer program product for identifying vulnerabilities in applications. The computer program product comprises one or more non-transitory computer-readable storage devices and program instructions stored on at least one of the one or more storage devices. The program instructions, when loaded and executed by a processor, cause an apparatus associated with the processor to identify vulnerabilities as described herein.

In an example embodiment, the program instructions cause an apparatus to search a database to identify payload characteristics for a HTTP request associated with a URL of a web application. In turn, the apparatus obtains one or more payloads with characteristics corresponding to the identified payload characteristics. Next, the apparatus sends a HTTP request with the obtained one or more payloads to the URL. Then, one or more responses to the HTTP request sent with the obtained one or more payloads are observed to determine if the web application includes one or more vulnerabilities.

It is noted that embodiments of the method, system, and computer program product may be configured to implement any embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows. Embodiments provide improved functionality to detect security vulnerabilities in applications.

Fuzzing is a technique whereby data is provided to programs and applications to determine how the programs and applications respond to the data. Fuzzing can be used to determine if programs and applications are susceptible to vulnerabilities. Most contemporary fuzzing solutions use brute force and often nonsensical payloads for fuzzing. Existing fuzzing methodologies have very poor code coverage because they rely on automated crawlers that are unable to exercise applications. The problem is even further exacerbated when these existing fuzzing tools have to exercise each URL and parameter multiple times.

Embodiments, which may be referred to herein as "Web Attack Simulator" (WAS), can crawl and store uniform resource locators (URLs), add, and fire high complexity and common weakness enumeration (CWE) classified payloads into applications. By firing Hypertext Transfer Protocol (HTTP) requests into target applications, and then gathering and analyzing vulnerable parameters, headers, and data on a per URL basis, embodiments can test applications and determine if the applications include vulnerabilities.

Embodiments can generate payloads based on HTTP specifications for all specified web application vulnerabilities on an interactive basis. Embodiments can also be deployed to test each vulnerability by fuzzing each parameter (including DOM based parameters) in GET and POST request methods of the applications and fuzz the HTTP headers according to the Request For Comments (RFCs) described at https://www.globalknowledge.com/us-en/resources/resource-library/articles/whats-an-rfc-and-what-can-they-do-for-me/#gref. Embodiments can also fuzz cloud enabled applications that are built around Representational state transfer (RESTful) application programming interfaces (APIs).

Figure 1:
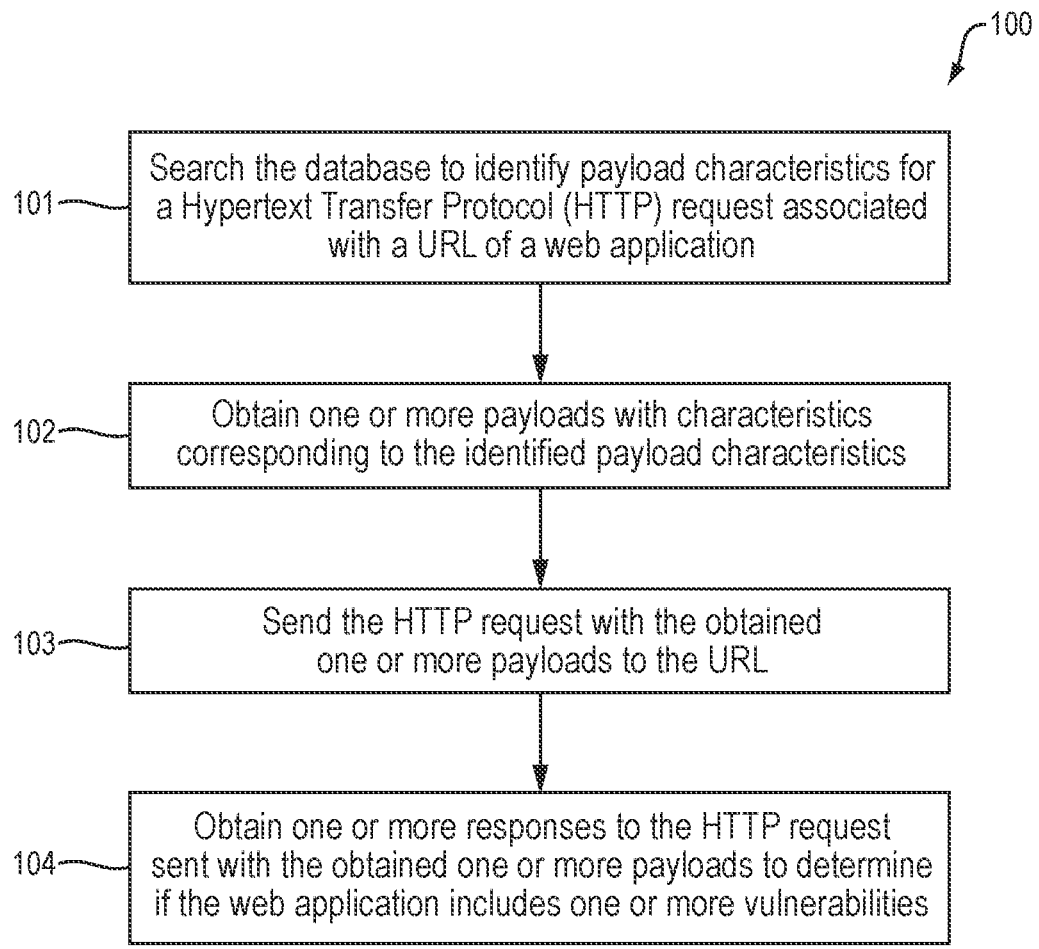
FIG. 1 is a flow diagram of a method for identifying security vulnerabilities according to an embodiment.

FIG. 1 is a flow diagram of a method 100 for identifying vulnerabilities in a web application according to an embodiment. The method 100 is computer implemented and, as such, may be implemented using any computing device, or combination of computing devices known in the art. Further, the method 100 may be implemented as part of a continuous integration continuous deployment (CICD) pipeline.

The method 100 starts at step 101 by searching a database to identify payload characteristics for a HTTP request associated with a URL of a web application. According to an embodiment, the HTTP request is at least one of: a get type request and a post type request. The searching 101 may be triggered automatically or triggered pursuant to a user request to determine if a web application includes one or more vulnerabilities. According to an embodiment of the method 100, searching 101 the database to identify payload characteristics for the HTTP request comprises searching the database for an HTTP response that occurred prior to the HTTP request and identifying the payload characteristics based upon the HTTP response that occurred prior to the HTTP request. In an embodiment, the payload characteristics may be identified based upon HTML content of the HTTP response that occurred prior to the HTTP request. Further, according to an embodiment of the method 100, the HTTP response is immediately prior to the HTTP request in hierarchical or sequential operation of the web application.

In an embodiment of the method 100, the payload characteristics may be any such characteristics known in the art. According to one such embodiment, the payload characteristics identified at step 101 include at least one of: type and format.

Next, at step 102, the method 100 obtains one or more payloads with characteristics corresponding to the identified payload characteristics. According to an embodiment of the method 100, obtaining 102 the one or more payloads with characteristics corresponding to the identified payload characteristics comprises searching a payload database based on the identified payload characteristics to obtain the one or more payloads with characteristics corresponding to the identified payload characteristics. Such functionality may include querying the payload database using the identified payload characteristics. The obtained 102 payloads may be any payloads known in the art. For example, in one such implementation, a given payload of the obtained one or more payloads is a CWE payload.

In an embodiment, each payload obtained at step 102 corresponds to a respective vulnerability. As such, embodiments of the method 100 can be configured to obtain 102 payloads for testing for particular vulnerabilities. In such implementations, vulnerability specific payloads can be obtained that target each input field for the HTTP request. To illustrate, at step 102, a payload may be obtained 102 for testing for a SQL injection attack and a payload may be obtained 102 for testing for an operating system (OS) command injection attack. Such payloads may include data for each variable in the HTTP request where, in one instance, said data tests for a SQL injection attack, and in another instance, said data tests for an OS command injection attack.

To continue, at step 103, the HTTP request is sent with the obtained one or more payloads to the URL. In this way, the method 100 can fuzz many variables, e.g., payloads, at a time. This results in the method 100 providing significant efficiency improvements compared to existing methods. It is noted above that in an embodiment of the method 100, the one or more payloads obtained at step 102 can corresponds to a respective vulnerability. When the HTTP request is sent with such one or more payloads, the method 100 is testing if the web application is susceptible to said respective vulnerabilities.

At step 104 the method 100 observes one or more responses to the HTTP request sent with the obtained one or more payloads to determine if the web application includes one or more vulnerabilities. These observed responses can be any responses that result from sending the HTTP request with the one or more payloads. For instance, the one or more responses can be HTTP responses, database responses, and interpreter responses, amongst other examples.

Embodiments of the method 100 may go further than observing 104 responses and may perform one or more protection, compensation control, or remediation, actions in response to determining the web application includes one or more vulnerabilities. Amongst other examples, embodiments of the method 100 may generate a report indicating results of the observing. Such a report can indicate one or more elements of the web application that are susceptible to the one or more vulnerabilities. These elements can include fields, variables in request lines, parameters passed with a request line, and parameters passed through headers. In this way, embodiments can provide forensic/contextual evidence of the problematic parameters, e.g., fields in the HTTP request that are attackable and the exact payloads that escape the validation scrutiny of the business logic. This forensic/contextual information presents highly actionable remediation information which can drastically cut time to market for applications.

Figure 2:
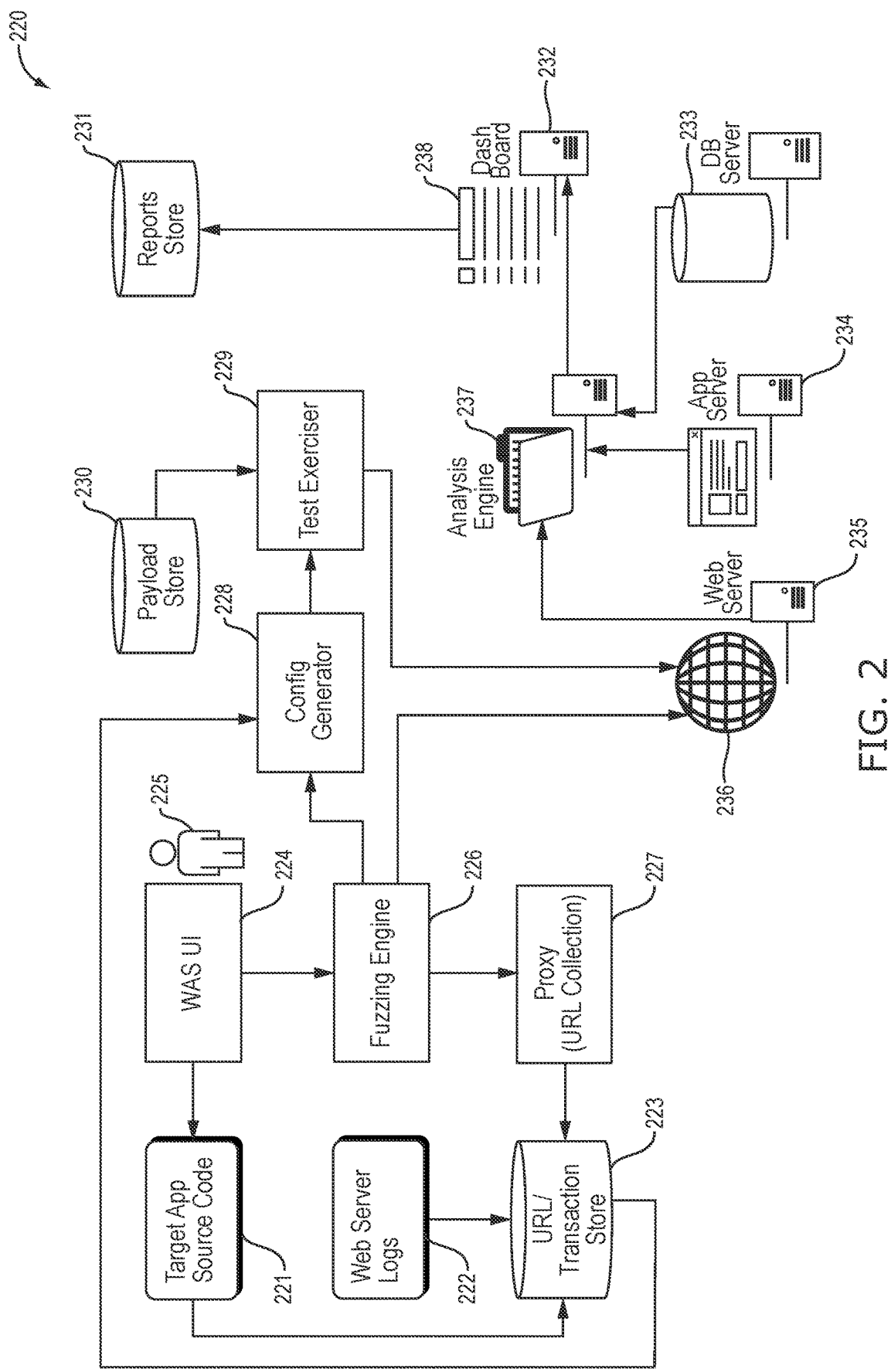
FIG. 2 is a simplified block diagram of a system for identifying vulnerabilities according to an embodiment.

FIG. 2 is a block diagram of a system 220, e.g., WAS, for identifying vulnerabilities in applications.

The system 220 utilizes a URL/transaction store 223 to store the application URLs/transactions that may be tested for vulnerabilities. The URL/transaction store 223 may be populated using any desired technique.

In an implementation of the system 220, the fuzzing engine 226 identifies the fuzz-able fields in the URLs that make up application(s) being tested, by either crawling through the application (provided using the web server 235, application server 234, and database server 233 and accessed via the network 236) and discovering more URLs, or by extracting the URLs from the code 221 or by post processing the web logs 222 of a deployed instance of the application. Some URLs may require manual crawling since their parameters may require contextual input that only a human can provide. In some cases, it is possible to read the form scripts and extract what parameters are expected by the JavaScript. This can help in adding more dynamically generated URLs. In another embodiment, to crawl an application, several parameters are configured. These may include started URL(s), application login credentials, and framework login credentials, amongst other examples. All such configuration information is saved in the config generator 228.

Regardless of how they are discovered, in the system 220, all discovered URLs are saved in the URL store 223. The URL store 223 is the repository of all the URLs and parameters collected by the various means described above. The URL store 223 may include various information about each URL, including each URL's request line, headers, and actual HTTP data. Users can also record "transactions" which are a collection of URLs that collectively achieve some user story such as placing shirts in a cart and then paying for the shirt on the checkout page. The system 220 user interface 224 allows the user 225 to add, modify, and/or delete individual URLs and parameters in the URL transaction store 223.

At some point in time, the system 220, e.g., via user initiation, can begin exercising the application with highly crafted malicious payloads by mixing the parameters of each URL with payloads from the payload store 230. In an example implementation, the test exerciser 229 withdraws application specific URLs or transactions from the URL store 223. In an embodiment, the fuzzing engine 226, via the proxy 227, obtains a URL from the URL store 223. The fuzzing engine 226, communicates the URL to the configuration generator 228. The configuration generator 228 determines the appropriate configuration for the URL and the associated payloads, e.g., format, etc. For example, the configuration generator 228 may look at URL, e.g., HTTP data, data stored in the URL store 223 and determine the type of payload data to be accessed to test the URL. In an embodiment, payloads correspond to particular vulnerabilities and, as such, a payload may be obtained for each vulnerability to be tested for. The test exerciser 229 then obtains payloads from the payload store 230 that conform with the configuration determined by the configuration generator 228.

At this stage, the test exerciser 229 has a URL with proper payload(s) and plays the URL with the payloads into the application's front end or Web Server 235 via the network 236. As the application's HTTP pipeline ingests the payload, strategically placed instrumentation in the web server 235, the application server 234, and the database server 233 identify relevant runtime instrumentation data and forward it to the analysis engine 237.

The analysis engine 237 deduces precisely if an attack is in progress or not. If an attack is detected, the analysis engine 237 reports it to a user or any desired computing device, e.g., a central monitoring system implemented with the device 232 and code/data 238, from where the system 220 picks up details. The system 220 can do so because the test exerciser 229 places an identifying HTTP header into the input payload. This special header is reported by the analysis engine 237. This allows the system 220 to match the inserted payload and parameter to the attack outcome detection. The results of the analysis engine 237 are collected into a JSON report and pushed into the reports database 231 from where, using an API, a user can access the results programmatically in the dashboard 232 (which is part of a central monitoring system). Since the system 220 knows exactly what payload, e.g., CWE is exercised, the system 220 is in a position to assign a CVSSv2/3 score to each vulnerability it can detect.

Embodiments can perform full or partial scans of an application. In an embodiment, e.g., the system 220, the test exerciser 229, is used to perform said scans. Partial scans are particularly useful to a software developer if they wish to verify a bug they may have fixed.

As referenced above, embodiments can utilize a URL store, e.g., the URL store 223. In an embodiment, the URL store is populated by crawling a target application to discover all the URLs in the application. The state machine 330 shows the details of a crawling operation that may be employed in embodiments.

The state machine 330 begins in initial state 334 and, then, crawls a target application to discover all the URLs 331 in the application. The state machine 330 aims to crawl and discover all the URLs 331 in the application and store them in the URL store for fuzzing them later. The crawling functionality can obtain URLs from variegated sources to achieve a high WIVET score and thoroughly test the application. The crawler 330 can utilize credentials 341 with various open-source crawlers, e.g., Burp 332 and ZAP 333, for automatic crawling. The automatic crawling effectively collects data for the variable types to give the right input to discover connected URLs. This reduces the chance of loss of connected URL due to a bad request caused by non-compliant input. Additionally, embodiments provide the capability to upload the application's web server 335 and proxy logs 336 to extract more URLs. The state machine 330 processes and parses 337 the URLs from all these sources into the WAS URL format (JSON format 338) and stores them in the URL store 339. These URLs are later utilized by the Test Exerciser to fuzz them with payloads and discover the vulnerabilities.

In an embodiment that performs crawling functionality, the various URLs visited by the crawler are extracted and saved into a format, e.g., JSON, for storing into a URL database, e.g., the URL store 223. The state machine 330 shows one such example embodiment of this functionality. In the state machine 330 application URLs are obtained from various sources and formats, as described above. The multiple URLs visited by the crawler are extracted and saved into an embodiment, e.g., WAS, understandable JSON format 338 for fuzzing them later. The unique WAS parser 337 ingests the URLs obtained from sources such as the opensource crawlers 332, 333, web server logs 335, and proxy logs 336. The parser 337 converts them into a JSON format 338 that the WAS Test Exerciser can utilize. After being converted to the JSON format 338, the URLs are stored in the URL store 339. Further, if obtained URLs cannot be converted to the JSON format 338 or if errors occur during the conversion, the parser moves to an error state 340.

Figure 3:
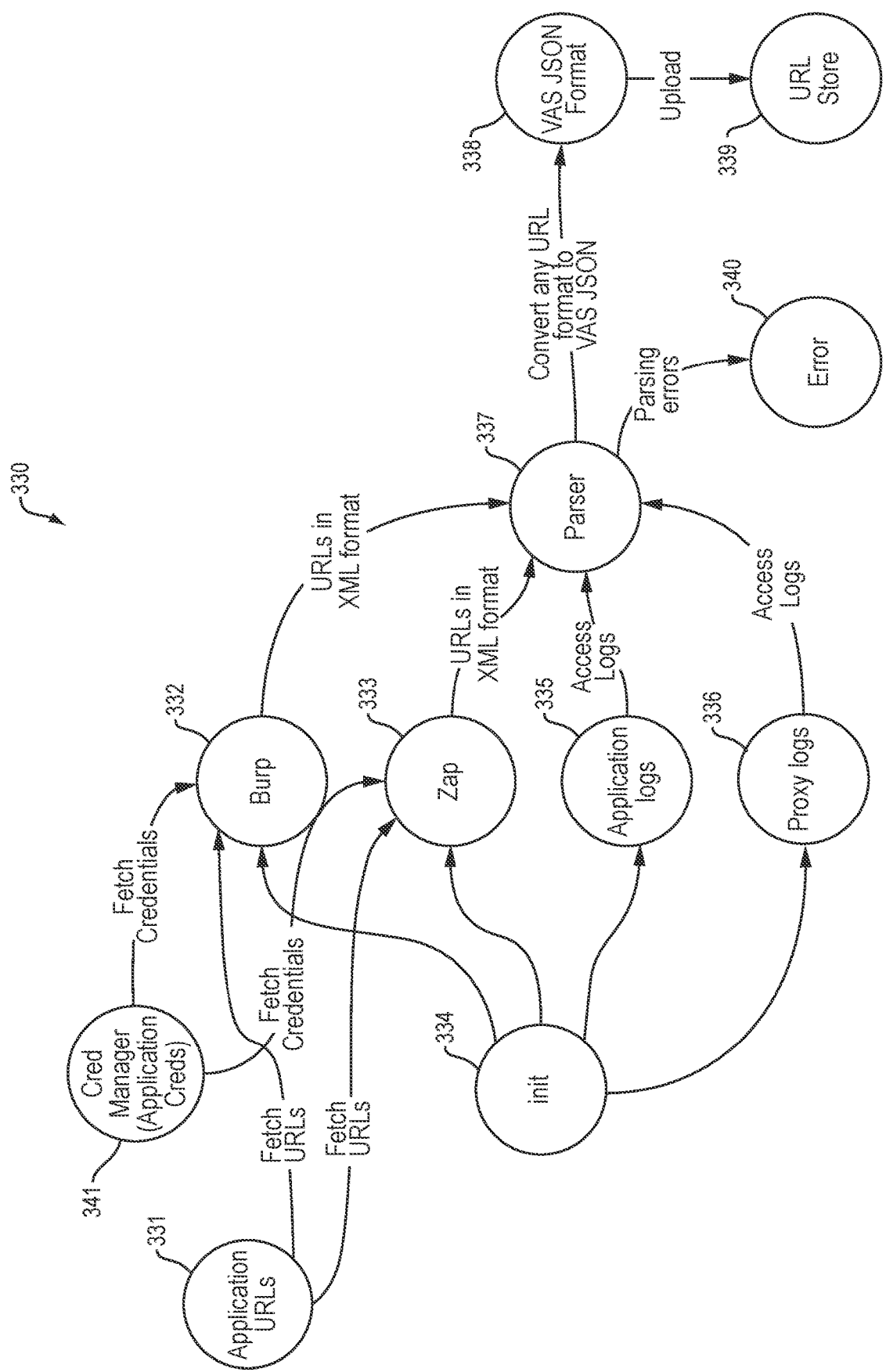
FIG. 3 illustrates an example crawling and parsing state machine that may be implemented in embodiments.
Figure 4:
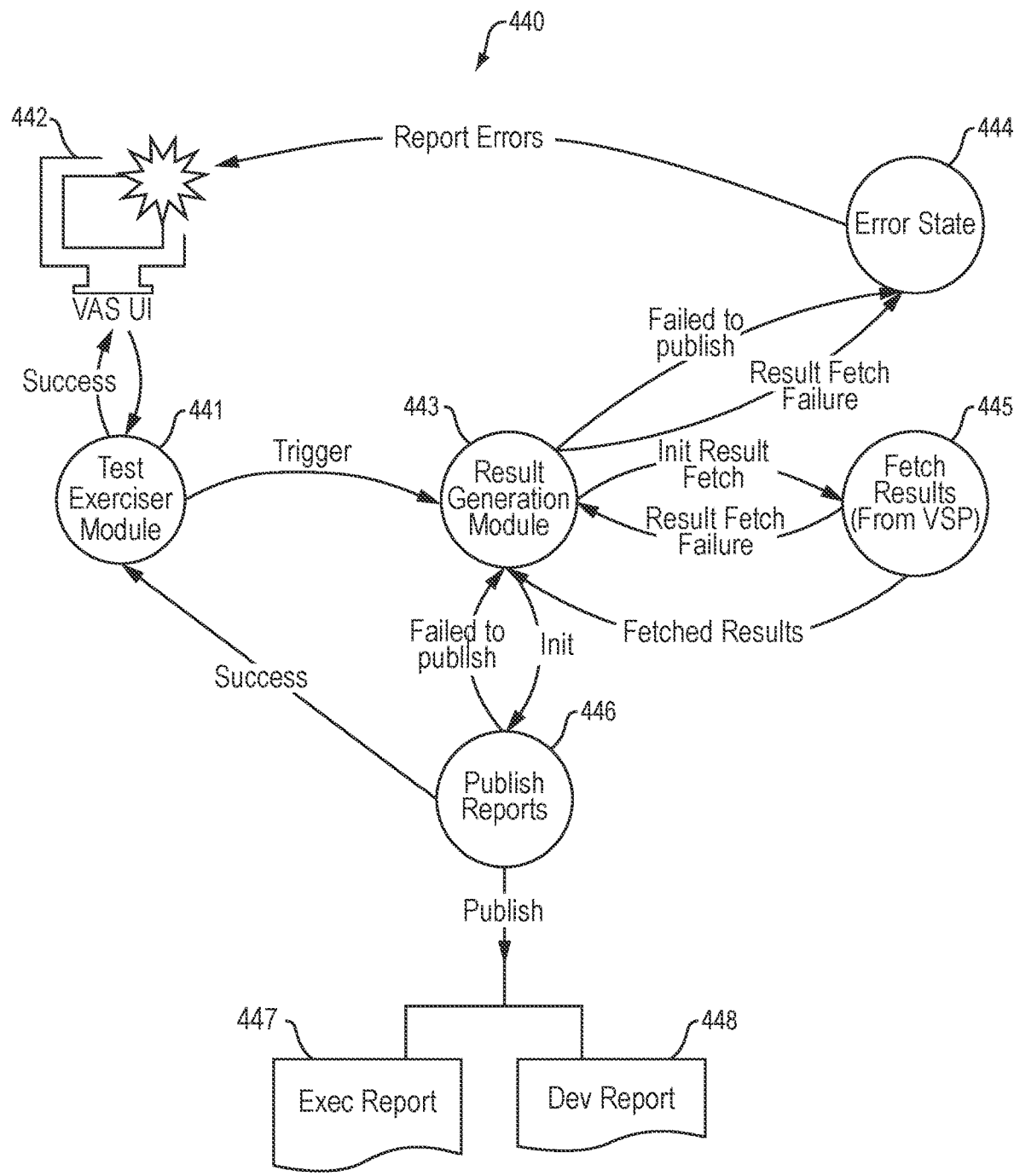
FIG. 4 depicts a fuzzing state machine according to an embodiment.

FIG. 4 depicts a fuzzing state machine 440 according to an embodiment. In an embodiment, the state machine 440 is implemented in the test exerciser 229 described hereinabove in relation to FIG. 2. In the state machine 440 the Test Exerciser 441 performs the fuzzing on application URLs, which may be obtained from crawling with the CAPEC based payloads, as described hereinabove in relation to FIG. 3. The test exerciser 441 discovers vulnerabilities, and publishes actionable reports. In this way, embodiments can exercise every parameter of every URL in the URL store against highly sophisticated CAPEC based attack vectors and comprehensively test the application. The Test Exerciser 441 can perform a full scan or a partial scan. A partial scan fuzzes a limited/selected set of URLs that is especially beneficial to a developer if they wish to verify a bug they may have fixed.

In an embodiment of the state machine 440, once the Test Exerciser Module (441) is ready, this status is returned to the WAS UI (442). A user on the WAS UI 442 can then exercise the option to generate a post-attack report for a previously fuzzed application. At this point, the WAS state advances from 441 to the Result Generation Module (443).

Upon collating the data, the WAS attempts to connect to the CMS to fetch the results. In case the communication cannot be established, the WAS state advances from 443 to the Error State (444) and upon generating the appropriate error notification (440), the WAS returns to the Result Generation Module (443).

If the communication with the CMS is successfully established, WAS advances from 443 to the Fetch Results State (445). If there is any issue in the results, the WAS goes back from 445 to 443 with details of the error. If the test results are not in error, the WAS goes back from 445 to 443 with a success report.

On receiving the test results in raw format, WAS goes from 443 to the Publish Reports State (446) where results are published in one of two formats, the Executive Report Format (447) or the Developer Report (448). In case the report cannot be published successfully, 446 reports to 443 which reports to 444. If the report can be successfully generated, 446 advances back to the idle 441 state.

Figure 5:
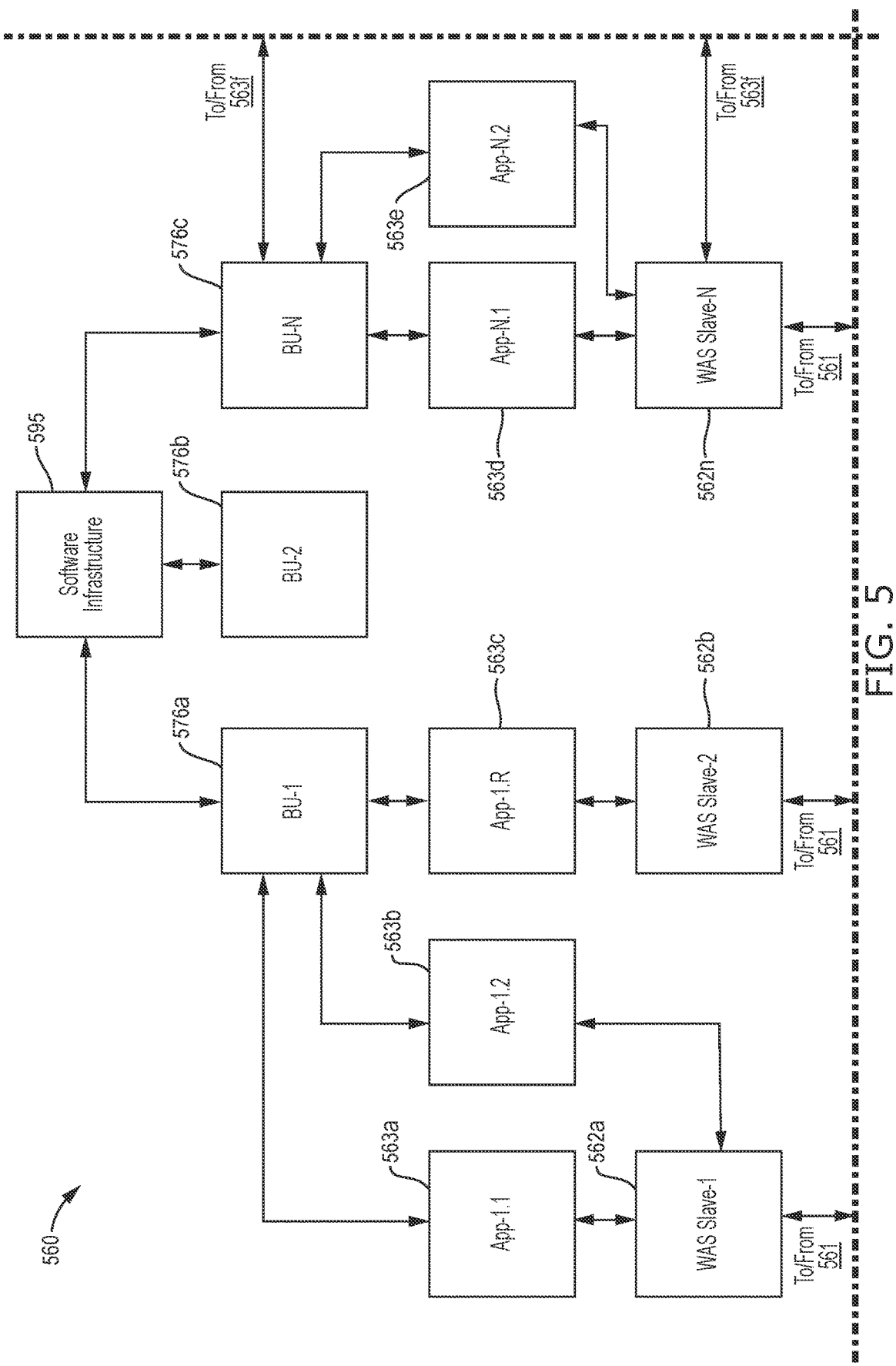
FIG. 5 is a block diagram of a system for identifying vulnerabilities in an application according to an embodiment.
Figure 5:
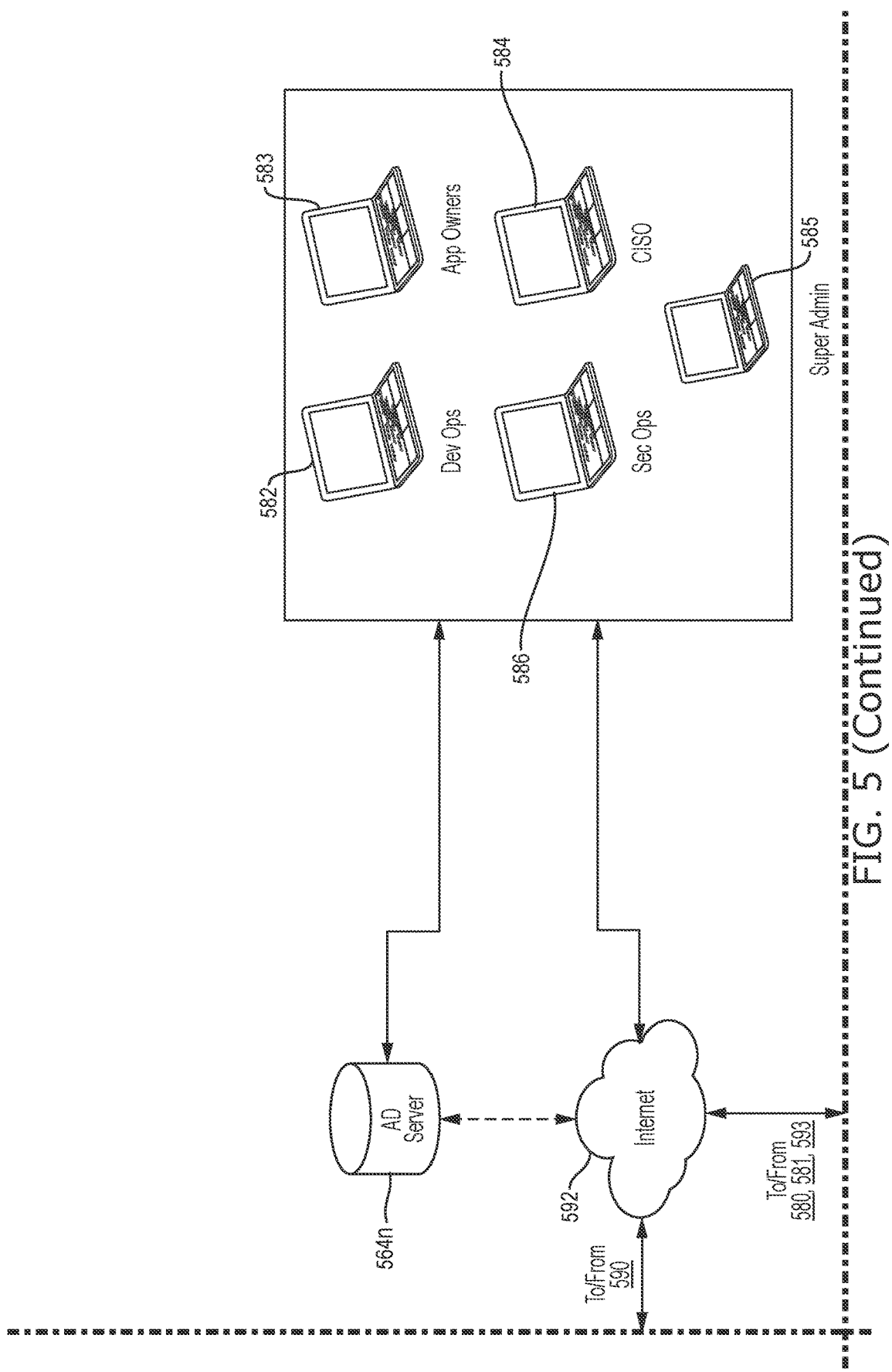
Figure 5:
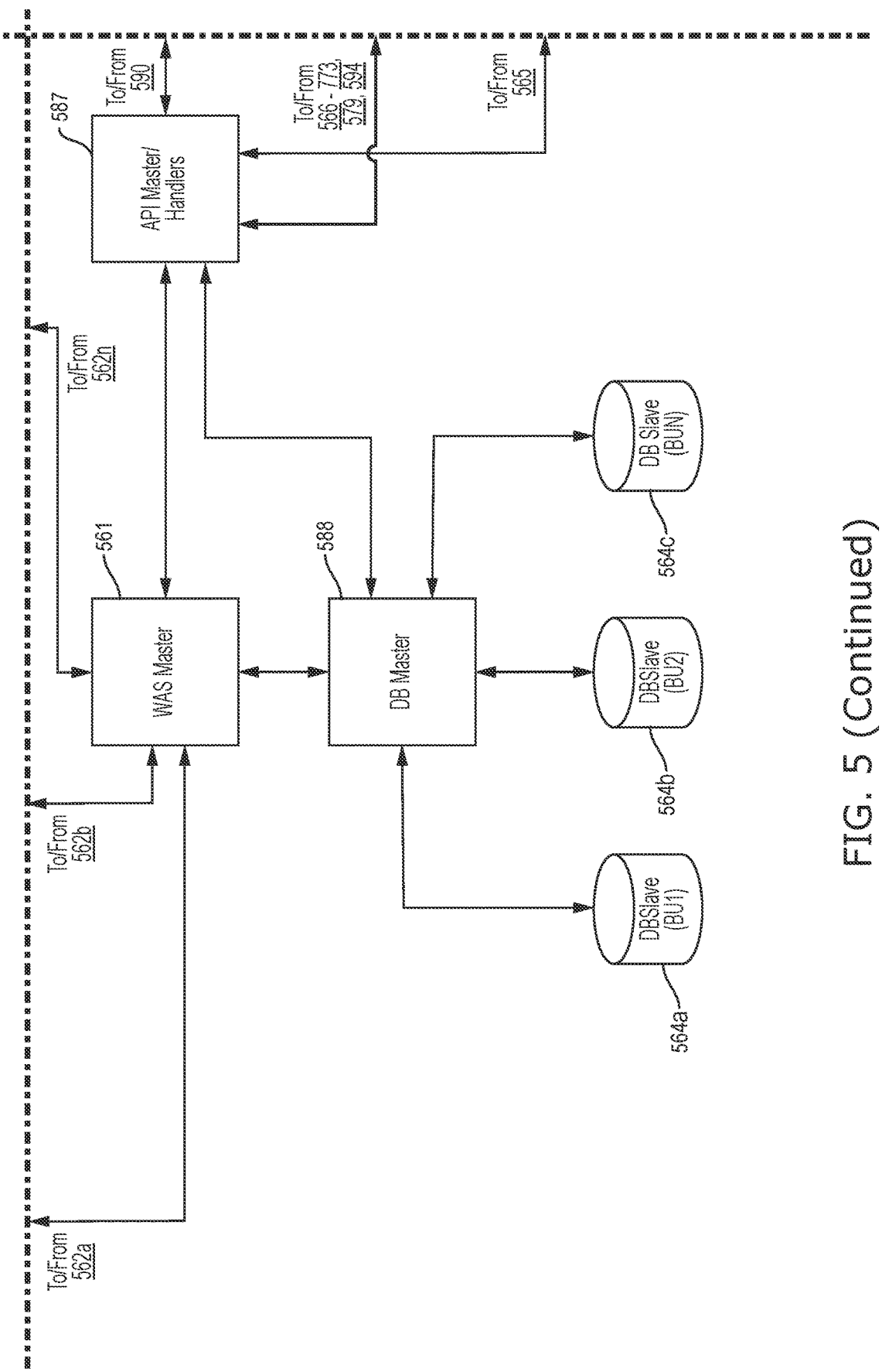
Figure 5:
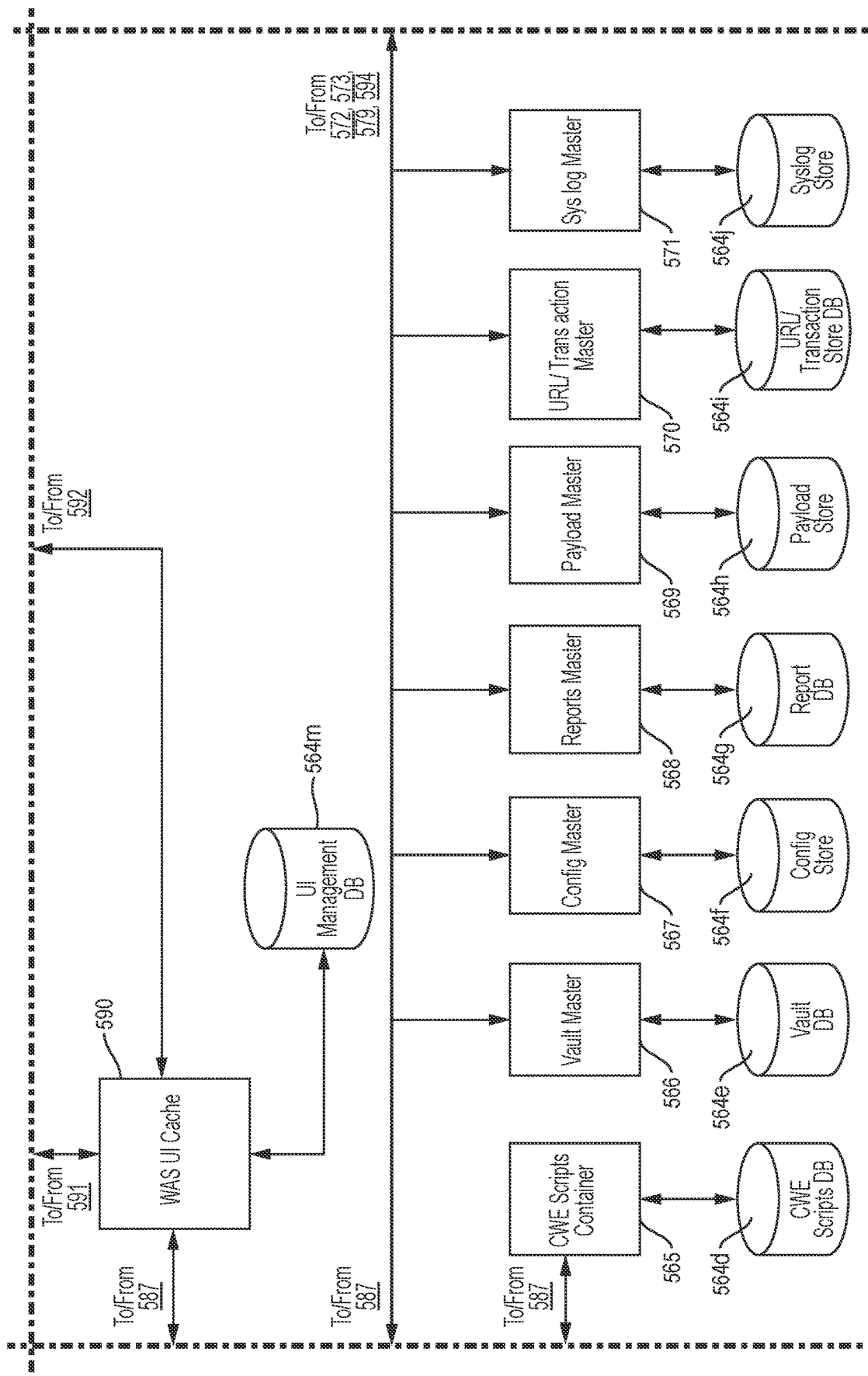
Figure 5:
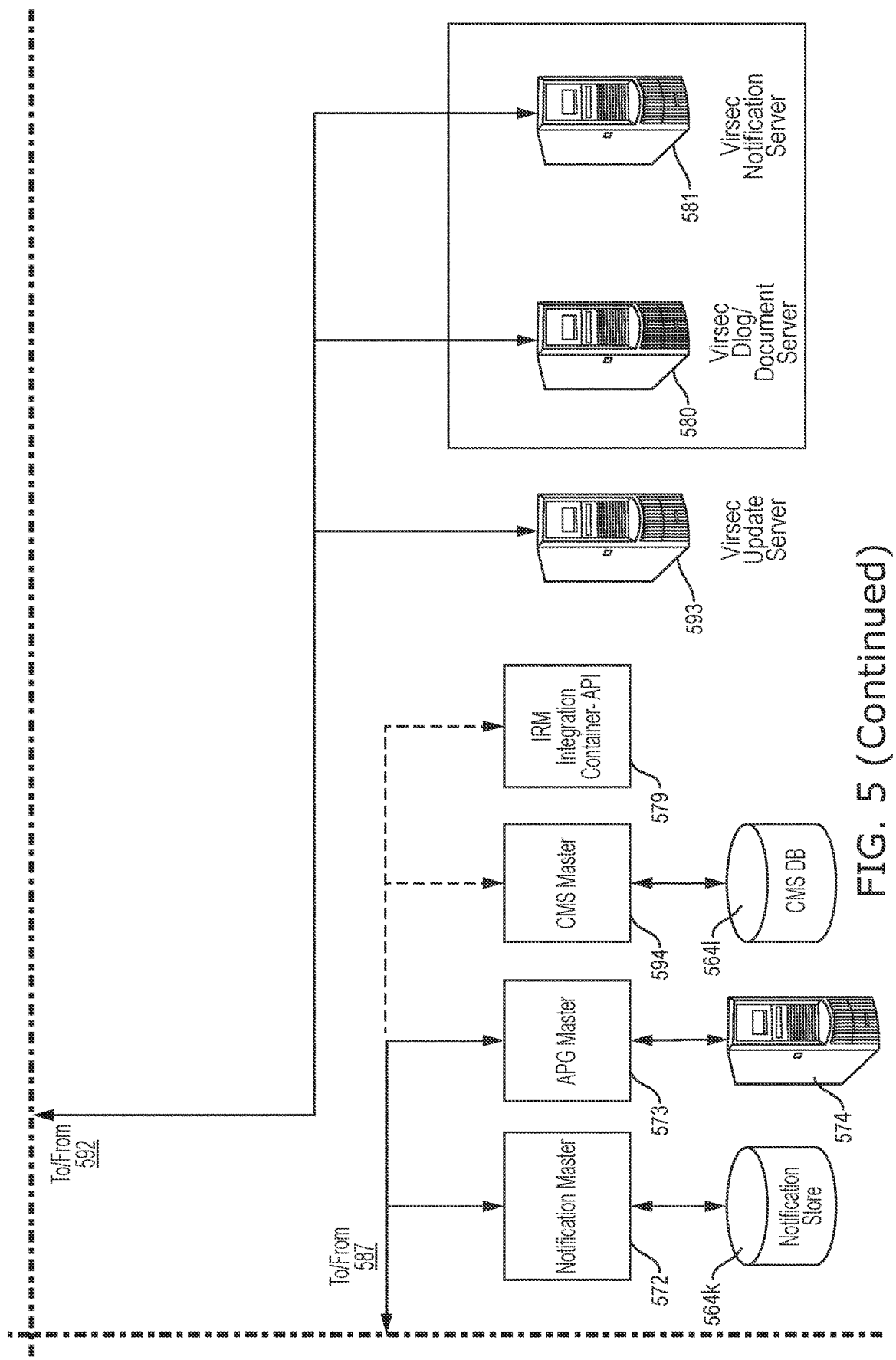

FIG. 5 is a block diagram of a system 560 for identifying vulnerabilities in an application according to an embodiment. As can be seen in FIG. 5, the system 560 via the WAS master 561 and WAS slaves 562a, 562b, and 562n, can fuzz many applications 563a-f simultaneously with many users. The applications 563a-f are part of business units 576a-c which form software infrastructure 595. An organization can have several business units, and each business unit can have various applications. The system 560 supports multi-tenancy to cater to multiple business units 576a-c (with their software infrastructure 577) and the business unit's 576a-c applications 563a-f by having a slave 562a-n per business unit managed by the WAS Master 561. WAS Master 561 also supports RBACs so that users from a specific business unit can only view the applications under that business unit.

The system 560 leverages many databases, 564a-n. Specifically, the slave databases 564a-c, CWE scripts database 564d, vault database 564e, configuration database 564f, report database 564g, payload database 564h, URL/transaction database 564i, syslog database 564j, notification database 564k, central management system database 564l, user interface management database 564m, and AD server database 564n. The system 560 also includes the database master 588. The WAS 560 master database 588 is a highly available database server with multiple slave databases (564a-564c), each serving a different business unit to divide the load.

The CWE scripts container 565 allows the system 560 to ingest scripts that can generate payloads of specific CWEs, such as those described at https://cwe.mitre.org/data/definitions/699.html. The system 560 also uses a vault 566 with the associated vault database 564e to store authentication keys for other tools that use its APIs and for any application credentials and authentication keys the system 560 needs to use to exercise APIs of other tools. The config master 567 and associated database 564f holds runtime configuration data for applications. The reports master 568 stores reports in the reports database 564g. Highly complex payloads on a per CAPEC (as described at https://capec.mitre.org/data/definitions/1000.html) basis are stored by the payload master 569 in the payload store 564h. This is unique because not all payloads are suited for specific CWEs. The URL and transaction master 570 with associated database 564i allows single or multiple URLs and transactions to be played out in the correct sequence. The SYSLOG master 571 and database 564j stores any notifications that are generated at various stages both by the UI code as well as the crawler, test Exerciser, report generator, and any other elements of the system 560. Notification master 572 and database 564k allows users to watch for recent high value events that need attention and once handled, the events are archived. The system 560 also uses the Application Protection gateway (APG) master 573 and server 574 to store compensating controls on a per application basis. The APG 573 protects the application when it is deployed with known bugs. Compensating controls make sure that the known issues applications cannot be exploited during periods bugs are being addressed. System 560 also includes central monitoring system (CMS) 594 with associated database 564*l*.

In the system 560, the Integrated Risk Management (IRM) Integration Container 579 provides an API that gives leverage to the user to integrate the system 560 with the various risk management software present in the user's organization to determine the risk scores of the assets that the organization possesses.

The system 560 includes the Update Server 593 which allows the system 560 to perform automatic updates by fetching all the respective artifacts from the Update Server 593 via the internet. Likewise, the system 560 includes the blog/document server 580 that contains all the WAS 560 documentation, including an Installation Guide, Operations Guide, Troubleshooting Guide, etc. that the users can access via the Internet. Further, the system 560 includes the Notification server 581. The notification server 581 allows user to initiate system 560 related queries/issues to a Support Team via the Notification Server 581.

The system 560 can integrate into the CICD pipeline offered by many tools such as Jenkins and GitLab, amongst others. The WAS 560 also communicates, via the network 592, with an update server. This communication allows the system 560 to be remotely upgraded. The system 560 UI, implemented using the UI cache 590, UI screen 591 and UI database 564*m*, can access documentation and wiki pages to show the latest troubleshooting guides. The system 560 also integrates with prominent Directory Servers for authentication. It also uses certificates for the WAS UI to communicate with the WAS backend. The WAS UI 591 can control the whole flow of the components in the system 560. A user can use the WAS UI 591 as a starting point to enter inputs, kick-off scans, track progress and get reports. WAS UI 591 can dump the information provided by a user into a WAS config file which the other components in the system 560 will use to run respective tasks.

The system 560 UI leverages a mem-cache server 590. The system 560 UI does not need to reach the backend server for retrieving data from the UI database 564*m*. The system 560 can cache data that does not change rapidly in the said mem-cache server 590. The system 560 also offers an API Server 587 that can rate control API requests that other systems may be making via API. The master API server 587 can contain many rest APIs that help the user interact with the system 560 backend. The rest API server is a separate, highly available server that gives users real-time updates on the progress of the system 560's tasks.

The system 560 stores reports in JSON, PDF and/or HTML formats. JSON reports allow users of the system 560 to retrieve the data via APIs. PDF and HTML reports allow users to interact with the system 560 as needed.

The system 560 can implement user roles 582-586. To provide such functionality, the system 560 associates a specific role 582-586 to each user for the access control. As such, in the system 560, each user can only perform actions based on the privileges defined as per the role. In the system 560, the roles are DevOps 582, Application Owners 583, CISO 584, SecOps 586, and Super Admin 585.

Figure 6:
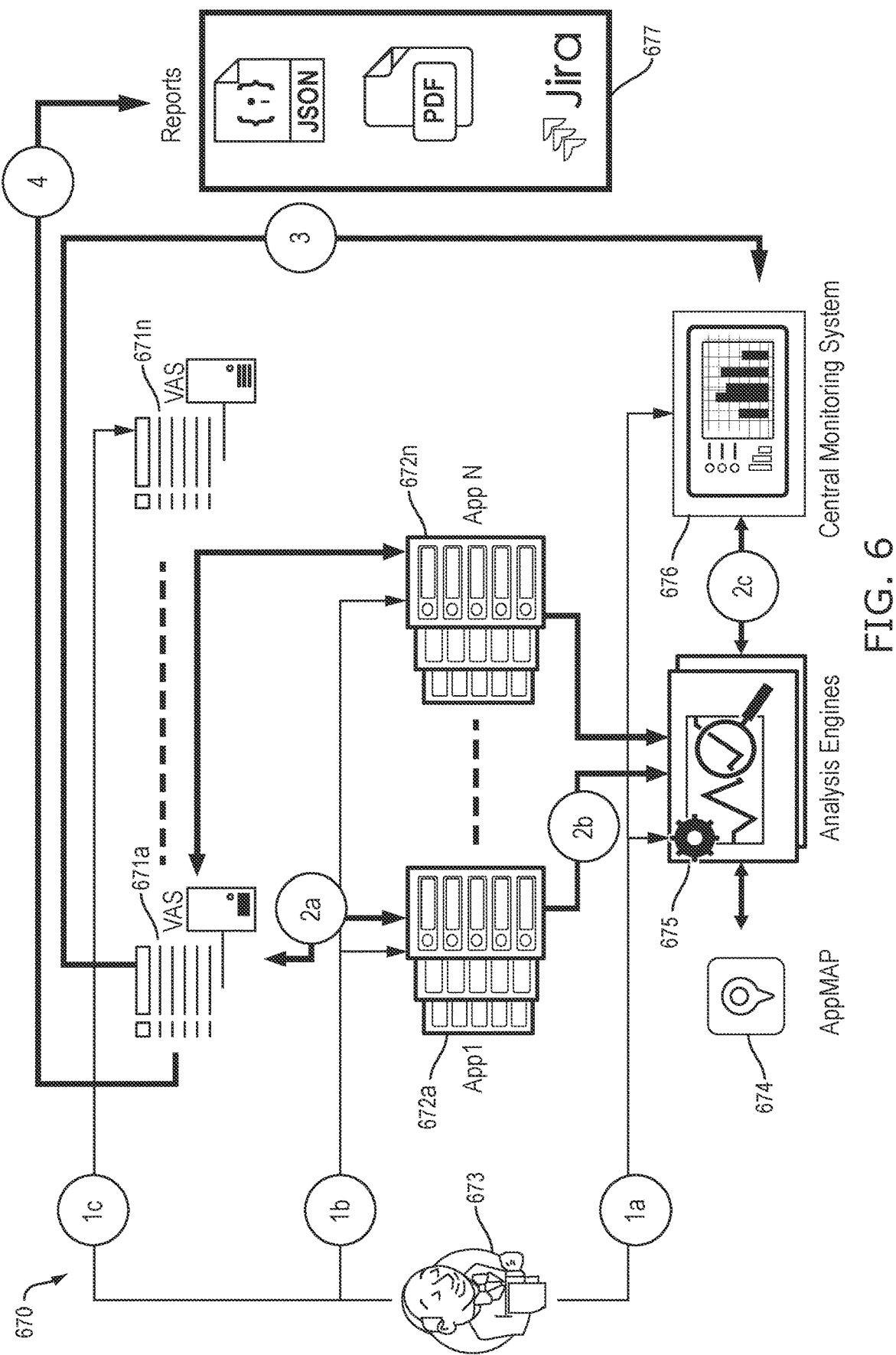
FIG. 6 illustrates how embodiments can interact with continuous integration/continuous development (CICD) pipelines.

FIG. 6 illustrates a system 670 that incorporates embodiments 671*a* and 671*n* configured to interact with continuous integration/continuous development (CICD) pipelines. In the system 670, CICD pipelines interact with the embodiments (i.e., WASs) 671*a* and 671*n* in order to automatically use the embodiments 671*a* and 671*n* to identify vulnerabilities in the applications 672*a* and 672*n* and obtain reports 677 showing the results of the vulnerability identification.

In one such implementation of the system 670, at step 1*a* Jenkins 673 or any other CI/CD server will initiate job (application) creation in VSP CMS (Central Monitoring System 676) with necessary information. This is utilized to monitor threats. At step 1*b* the Jenkins server 673 deploys the application 672*a-n* and makes it ready for testing by WAS 671*a-n*. In turn, at step 1*c*, Jenkins server 673 initiates WAS 671*a-n* scan and tests the application 672*a-n*.

For step 2*a*, WAS 671*a-n* fetches URLs from the URL store and payloads from the payload store. WAS 671*a-n* then fuzzes the application 672*a-n* with every URL and parameter.

At step 2*b* all events are captured by VSP instrumentation of the Application server and sent to VSP AE (Analysis Engine 675). AE 675 performs analysis of the collected events (using app map 674) and reports incidents (if any) to CMS 676. Thus, at step 2*c* CMS 676 (a central dashboard of VSP) collects incidents and manages configuration of VSP.

WAS 671*a* fetches all the collected incidents from CMS 676 at step 3 and, in turn, at step 4, WAS 671*a* exports the collected incidents to multiple report 677 formats (such as PDF, HTML) and creates JSON reports for external consumption.

Embodiments, e.g., the method 100, system 220, and system 560, have numerous advantages compared to existing fuzzing methodologies.

Embodiments provide the ability to enumerate more dynamic web pages. By understanding each field in HTTP requests, e.g., GET/POST request, embodiments can exercise more parts of applications than existing methodologies. Embodiments also can fuzz each field with CWE specific payloads (including some encoded versions of the specific payload) to see if business logic performs basic and enhanced (due to encoding) validation for that CWE payload. Embodiments can also cooperate with instrumentation functionality provided by the Applicant, which means embodiments can understand more than HTTP responses to the HTTP request, but can also determine other responses, e.g., interpreter and database responses. In this way, embodiments observe facts and do not use conjectures in making (non-)attack decisions. This results in embodiments not having false positives.

Embodiments can also generate reports in minutes. In the case of existing methods, ~70% of results are false positives and vulnerability reports need to be curated manually before they can be presented to the end-user (application developer). This curation can take weeks, making the usefulness of such reports very low. This often leads to a flawed application being deployed and this application being attacked.

Reports provided by embodiments also provide highly actionable data for end-users (developers) which cuts down the time they need to fix any bugs.

Also advantageously, embodiments can implement an Interactive Authentication Feature that enables embodiments to capture authentication requests for all the applications including dynamic single page applications (SPA) applications. In many applications, especially SPA applications, there is only one URL but hundreds of JavaScript (hereafter called a hive). Individual JavaScript are triggered by configuration information as well as raw data in the HTTP packet. Given this scenario, it may become impossible for an algorithm to figure out which configuration flag will cause which JavaScript in the JavaScript hive to respond. As such, embodiments can provide a manual Interactive Authentication mode.

Embodiments also have high application code coverage (Wivet score) for fuzzing because embodiments can rely on various ways to extract URLs such as automated crawling, webserver logs, and decompiling jars to obtain URLs from source code, amongst other examples. Embodiments provide a CAPEC (https://capec.mitre.org/) based payload store to cover every attack simulation. This allows embodiments to assign CVSS scores. Embodiments also provide unique and deterministic ways to discover vulnerabilities with approximately zero false positives. Advantageously, embodiments can be integrated with Applicant's Integrated Risk Management (IRM) (further described at https://www.gartner.com/en/information-technology/glossary/integrated-risk-management-irm) that performs SCA and IAST scans, de-dupes, and generates highly actionable reports.

Further still, embodiments are CICD enabled. Because embodiments do not generate false positives, reports generated by embodiments can be used immediately. Embodiments also generate compensating controls for protecting against known vulnerabilities and allows developers to re-run reports. Further, the generated reports provide highly actionable remediation information and can pinpoint exact parameters in URLs that are vulnerable.

Embodiments also allow users to send serialized data for fuzzing and can fuzz many applications simultaneously. Contemporary tools typically hit a URL twice, once without fuzz and once with fuzz to determine if there is an attack. This leads existing methods to get very high false positive ratios. Embodiments can be configured to not hit a URL twice to determine if there is an attack. Further, false positives are not a problem for embodiments because embodiments have deep instrumentation and can observe actual state in the application. Further, the amount of time taken to complete fuzzing gets cut down in half since every URL and parameter does not need to be hit twice.

Figure 7:
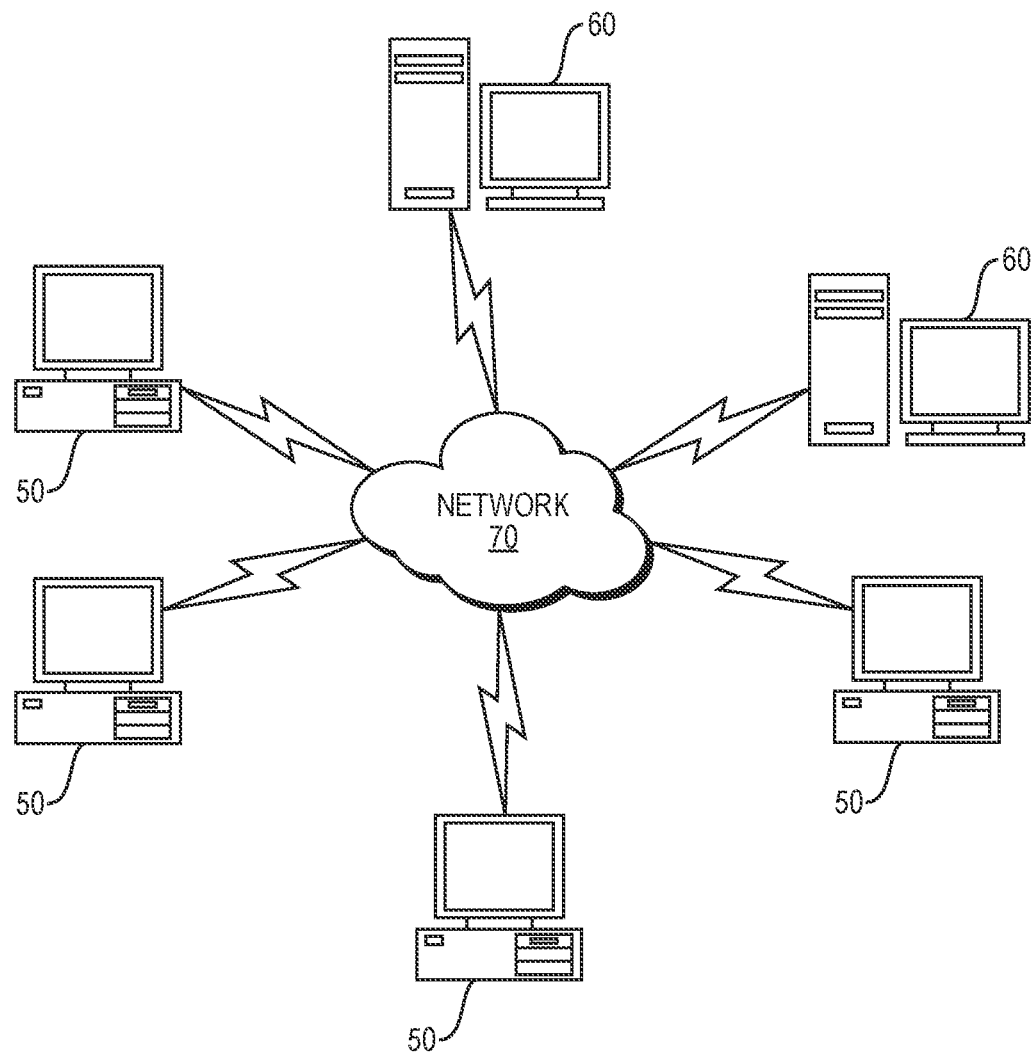
FIG. 7 illustrates a computer network or similar digital processing environment in which embodiments may be implemented.

FIG. 7 illustrates a computer network or similar digital processing environment in which embodiments of the present disclosure may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Client computers/devices 50 and/or servers 60 may be configured, alone or in combination, to implement the embodiments described herein, e.g., the method 100, amongst other examples. The server computers 60 may not be separate server computers but part of cloud network 70.

Figure 8:
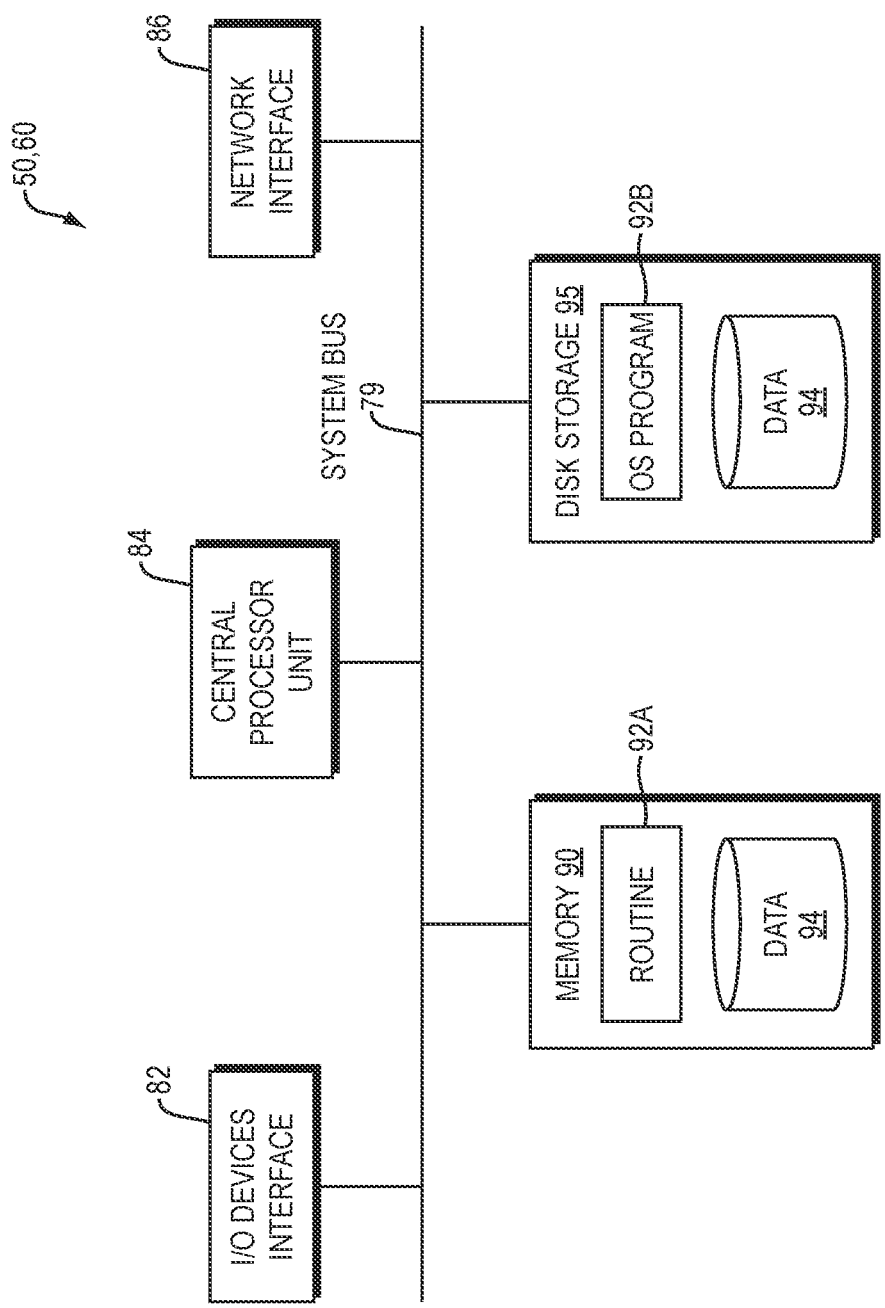
FIG. 8 is a diagram illustrating an example internal structure of a computer in the environment of FIG. 7.

FIG. 8 is a diagram of an example internal structure of a computer (e.g., client processor/device 50 or server computers 60) in the computer system of FIG. 7. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an input/output (I/O) device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 7). Memory 90 provides volatile storage for computer software instructions 92 and data 94 used to implement an embodiment of the present disclosure (e.g., the method 100, amongst others). Disk storage 95 provides non-volatile storage for computer software instructions 92 and data 94 used to implement an embodiment of the present disclosure. A central processor unit 84 is also attached to the system bus 79 and provides for the execution of computer instructions.

Embodiments or aspects thereof may be implemented in the form of hardware including but not limited to hardware circuitry, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method of identifying vulnerabilities in a web application, the method comprising:
    searching a database to identify payload characteristics for a Hypertext Transfer Protocol (HTTP) request associated with a Uniform Resource Locator (URL) of a web application, wherein the searching comprises (i) searching the database for an HTTP response that occurred prior to the HTTP request and (ii) identifying the payload characteristics based upon the HTTP response that occurred prior to the HTTP request;
    obtaining one or more payloads with characteristics corresponding to the identified payload characteristics;
    sending the HTTP request with the obtained one or more payloads to the URL; and observing one or more responses to the HTTP request sent with the obtained one or more payloads to determine if the web application includes one or more vulnerabilities.

2. The method of claim 1 further comprising:
in response to determining the web application includes the one or more vulnerabilities, performing one or more protection, compensation control, or remediation, actions.

3. The method of claim 1 wherein obtaining the one or more payloads with characteristics corresponding to the identified payload characteristics comprises:
searching a payload database based on the identified payload characteristics to obtain the one or more payloads with characteristics corresponding to the identified payload characteristics.

4. The method of claim 1 wherein the HTTP response is immediately prior to the HTTP request in hierarchical operation of the web application.

5. The method of claim 1 wherein each of the obtained one or more payloads corresponds to a respective vulnerability.

6. The method of claim 5 wherein sending the HTTP request with the obtained one or more payloads tests if the web application is susceptible to each respective vulnerability.

7. The method of claim 1 wherein the characteristics include at least one of: type and format.

8. The method of claim 1 further comprising:
generating a report indicating results of the observing.

9. The method of claim 8 wherein the report indicates one or more elements of the web application that are susceptible to the one or more vulnerabilities.

10. The method of claim 9 wherein the one or more elements include at least one of: a field, variables in request lines, parameters passed with a request line, and parameters passed through headers.

11. The method of claim 1 wherein the HTTP request is at least one of: a get type request and a post type request.

12. The method of claim 1 wherein a given payload of the obtained one or more payloads is a common weakness enumeration (CWE) payload.

13. A system for identifying vulnerabilities in a web application, the system comprising:
a processor; and
a memory with computer code instructions stored thereon, the processor and the memory, with the computer code instructions, being configured to cause the system to:
search a database to identify payload characteristics for a Hypertext Transfer Protocol (HTTP) request associated with a Uniform Resource Locator (URL) of a web application, wherein the searching comprises (i) searching the database for an HTTP response that occurred prior to the HTTP request and (ii) identifying the payload characteristics based upon the HTTP response that occurred prior to the HTTP request;
obtain one or more payloads with characteristics corresponding to the identified payload characteristics;
send the HTTP request with the obtained one or more payloads to the URL; and
observe one or more responses to the HTTP request sent with the obtained one or more payloads to determine if the web application includes one or more vulnerabilities.

14. The system of claim 13 wherein the processor and memory, with the computer code instructions, are further configured to cause the system to:
in response to determining the web application includes the one or more vulnerabilities, perform one or more protection, compensation control, or remediation, actions.

15. The system of claim 13 wherein, in obtaining the one or more payloads with characteristics corresponding to the identified payload characteristics, the processor and the memory, with the computer code instructions, are configured to cause the system to:
search a payload database based on the identified payload characteristics to obtain the one or more payloads with characteristics corresponding to the identified payload characteristics.

16. The system of claim 13 wherein each of the obtained one or more payloads corresponds to a respective vulnerability and, wherein sending the HTTP request with the obtained one or more payloads tests if the web application is susceptible to each respective vulnerability.

17. The system of claim 13 wherein the processor and memory, with the computer code instructions, are further configured to cause the system to:
generate a report indicating results of the observing.

18. A computer program product for identifying vulnerabilities in a web application, the computer program product comprising:
one or more non-transitory computer-readable storage devices and program instructions stored on at least one of the one or more storage devices, the program instructions, when loaded and executed by a processor, cause an apparatus associated with the processor to:
search a database to identify payload characteristics for a Hypertext Transfer Protocol (HTTP) request associated with a uniform resource locator (URL) of a web application, wherein the searching comprises (i) searching the database for an HTTP response that occurred prior to the HTTP request and (ii) identifying the payload characteristics based upon the HTTP response that occurred prior to the HTTP request;
obtain one or more payloads with characteristics corresponding to the identified payload characteristics;
send the HTTP request with the obtained one or more payloads to the URL; and
observe one or more responses to the HTTP request sent with the obtained one or more payloads to determine if the web application includes one or more vulnerabilities.

* * * * *